United States Patent [19]

Cartry

[11] Patent Number: 5,446,256
[45] Date of Patent: Aug. 29, 1995

[54] DEVICE FOR WORKING INSIDE A TUBULAR ELEMENT BY LASER

[75] Inventor: Jean-Pierre Cartry, Lyons, France

[73] Assignee: Framatome, Courbevoie, France

[21] Appl. No.: 975,720

[22] Filed: Nov. 13, 1992

[30] Foreign Application Priority Data

Nov. 13, 1991 [FR] France .................. 91 13937

[51] Int. Cl.⁶ .................. B23K 26/00; B23K 26/08
[52] U.S. Cl. .................. 219/121.63; 219/121.64; 219/121.78
[58] Field of Search .................. 219/121.63, 121.64, 219/121.78, 121.6, 121.61; 376/260

[56] References Cited

U.S. PATENT DOCUMENTS 5,097,110 3/1992 Hamada et al. ............... 219/121.63

FOREIGN PATENT DOCUMENTS

0406043A1 1/1991 France .
2656558 7/1991 France .

Primary Examiner—Mark H. Paschall
Attorney, Agent, or Firm—Pollock, Vande Sande & Priddy

[57] ABSTRACT

This device comprises a laser head (10) designed to be placed inside a tubular element (12) is provided with an aperture (34) intended for the exit of a working laser beam and arranged on a movable portion (18) of the head. This movable portion (18) is driven in rotation by a motor located on the outside of the tubular element and connected to the movable portion (18) by a flexible shaft (40) and a speed reducer (38). The latter, arranged in a fixed portion (20) of the head in the vicinity of the movable portion (18), comprises five epicyclic gears (50A to 50E) coupled in series. The device is used for the sleeve lining of the primary-water tubes of a steam generator of a pressurized water nuclear reactor.

9 Claims, 1 Drawing Sheet

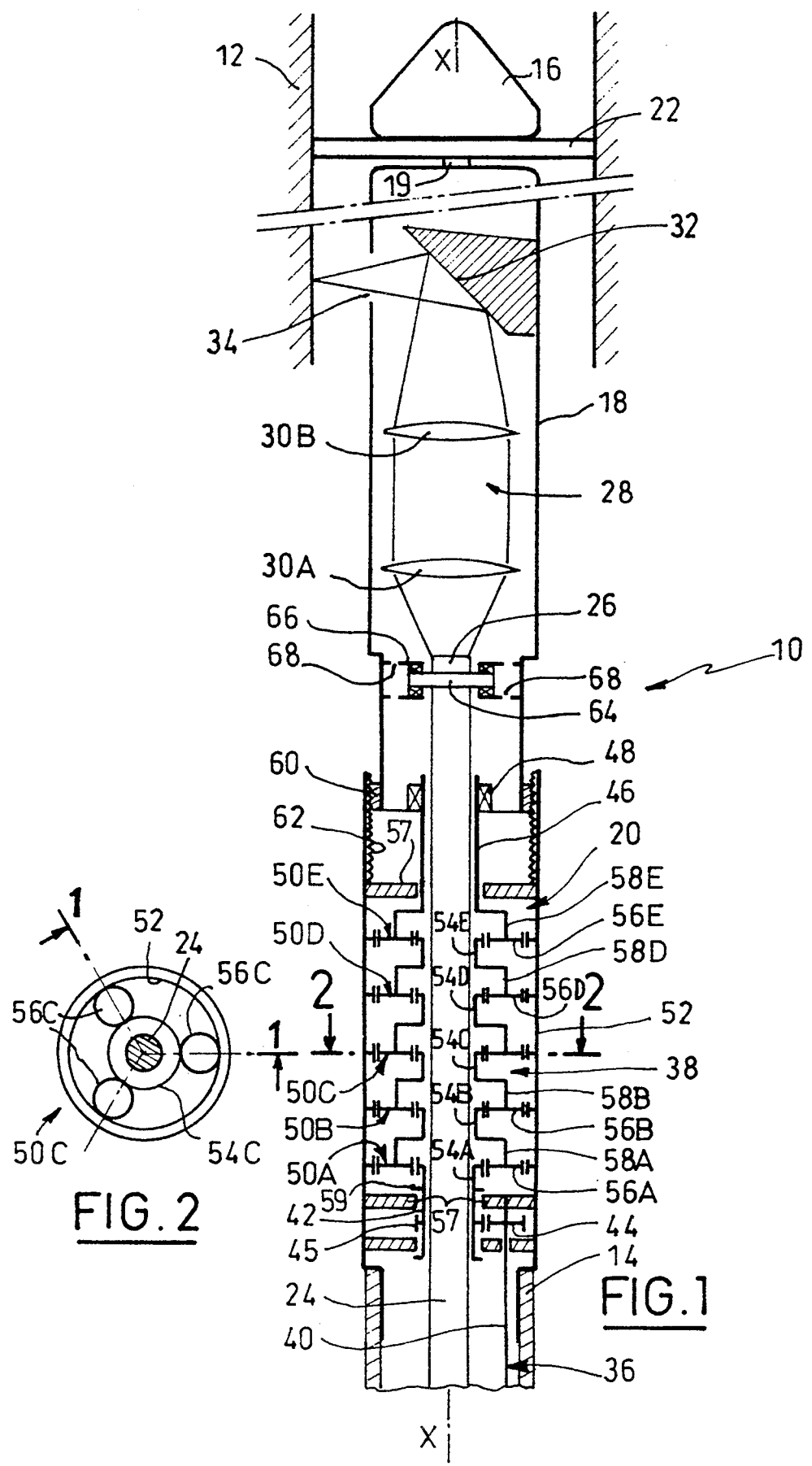

DEVICE FOR WORKING INSIDE A TUBULAR ELEMENT BY LASER

FIELD OF THE INVENTION

The present invention relates to a device for working inside a tubular element by laser, and, particularly for laser-welding operations in tubes of small diameter, such as the primary-water tubes of a steam generator of a pressurized-water nuclear reactor.

These tubes, of a shape bent in the form of a U, are arranged as a bundle in the steam generator and are held relative to one another by means of plates forming spacers spaced over the height of the bundle. The ends of these tubes are fastened in a tube plate of great thickness. The part of the steam generator located below the tube plate forms a water box.

Cracks can appear in the walls of the tubes of the steam generator during the normal lifetime of the reactor. It is known to repair these tubes by sleeve lining.

A process for the sleeve lining of a cracked tube, in which a repair sleeve is fastened in the tube by laser welding, is known. Circular or helical welding beads are made by means of a device for working by laser, designed to be introduced into the water box and into the primary-water tubes of the steam generator.

Already known in the is a device for working inside a tubular element by laser, of the type comprising a laser head, which has a movable portion provided with an aperture for the exit of a working laser beam, and means for driving this movable portion in rotation, comprising a motor located on the outside of the head, a speed reducer and flexible means for transmitting the rotational movement of the motor to the movable portion by means of the reducer.

Circular welding beads are made by rotating the movable portion of the laser head. Helical welding beads are made by combining rotational and translational movements of the movable portion.

Conventionally, the motor driving the movable portion and the speed reducer are arranged in the water box of the steam generator. In some instances, the welding head must be positioned at a great height in a tube of the steam generator. The flexible transmission means connecting the motor to the movable portion therefore have a considerable length. Moreover, the optimum conditions for making a circular or helical welding bead necessitate a relatively low rotational speed of the movable portion and of the driving means associated with it.

The considerable length of the flexible transmission and the low rotational speed of the output shaft of the reducer result in a non-uniform rotational speed of the movable portion of the laser head and consequently in defects in the formation of the welding bead.

SUMMARY OF THE INVENTION

The object of the invention is, to make circular or helical welding beads of good quality in a steam-generator tube by using a laser head equipped with a standard motor for driving in rotation located on the outside of the tube.

To this end, the subject of the invention is a device for working inside a tubular element by laser, of the abovementioned type, in which the speed reducer is arranged in a rotationally fixed portion of the head, in the vicinity of the movable portion.

According to other characteristics of the invention:

the reducer comprises at least one epicyclic gear comprising a large planet wheel with internal toothing, a central planet wheel, satellites in engagement with the large planet wheel and the central planet wheel, and a satellite carrier, the central planet wheel of an epicyclic gear being solid with an input shaft of the reducer, the satellite carrier of an epicyclic gear being solid with an output shaft of the reducer, and the large planet wheel of each epicyclic gear being solid with the rotationally fixed portion of the head;

the reducer comprises at least two epicyclic gears coupled in series in such a way that, on the one hand, the fixed large planet wheels consist of an internally toothed tubular member common to all the epicyclic gears and, on the other hand, the satellite carrier of an upstream epicyclic gear is solid with the central planet wheel of a succeeding epicyclic gear the upstream epicyclic gear being that one of these two gears which is nearer the input of the reducer;

the reducer comprises five epicyclic gears coupled in series;

the central planet wheels, the satellite carriers of the epicyclic gears and the input and output shafts of the reducer are of generally tubular shape and are coaxial with the longitudinal axis of the laser head and with an optical fiber passing longitudinally through the reducer and conveying the working laser beam;

the distal end of the optical fiber is integral in terms of translational movement with the movable portion, but free in terms of rotation relative to the latter;

the output shaft of the reducer is splined on its outer surface and interacts with a crown of complementary internal toothing solid with the movable portion of the laser head, in such a way that this movable portion is integral in terms of rotation with the output shaft and axially displaceable relative to the latter;

the means for transmitting the rotational movement of the motor comprise a transmission shaft equipped with an end pinion meshing with an external toothing of the input shaft;

the epicyclic gears each comprise three satellites.

BRIEF DESCRIPTION OF THE DRAWINGS

An exemplary embodiment of the invention will be described below with reference to the accompanying drawings in which:

FIG. 1 is a schematic view in longitudinal section along the line 1—1 of FIG. 2, showing a laser head of a device according to the invention; and FIG. 2 is a sectional view along line 2—2 of FIG. 1.

DETAILED DESCRIPTION

FIG. 1 shows a laser head 10, of generally cylindrical shape, of a device according to the invention for working by laser for the purpose of making helical welding beads. This laser head 10 is introduced into a tubular element 12 consisting, for example, of a repair sleeve for a primary-water tube of a steam generator of a nuclear reactor.

The laser head 10 is carried by a flexible tubular extension piece 14 connected to handling and control means (not shown) located outside the tubular element 12.

The laser head 10 comprises, from top to bottom according to FIG. 1, a guide nose 16, a movable portion 18 mounted rotatably about an axial spindle 19 and a rigid portion 20 fixed relative to the tubular element 12 and connected to the extension piece 14.

The laser head 10 further comprises, known means for positioning in the tubular element 12, of which only a centering brush 22 arranged under the guide nose 16 has been shown. These positioning means are, for example, of the type described in FR-2,656,558.

The laser beam of the device for working by laser is conveyed to the head 10 by means of an optical fiber 24 coaxial with the longitudinal axis X—X of the head. The distal end 26 of the optical fibre is arranged inside the movable portion 18 of the laser head, being carried by means which will be described later.

The optical fiber 24 emits a beam in the direction of an optical cell 28 comprising a plurality of juxtaposed lenses 30A, 30B for collimating and focusing the beam.

The focused beam is returned radially by a mirror 32, inclined at 45° and solid with the movable portion 18, towards a welding location situated on the outside of the laser head, by way of a lateral aperture 34 of the latter.

The device for working by laser comprises means for driving in rotation and means for the axial displacement of the movable portion 18 of the laser head.

The means for driving in rotation comprise a motor (not shown), located on the outside of the tubular element 12, for example in the water box of the steam generator. This motor is connected by transmission means 36 to a speed reducer 38.

The transmission means 36 comprise a flexible cable 40 forming a transmission shaft, arranged on the inside of the extension piece 14. The transmission shaft 40 is connected, by means of a first end (not shown), to the drive motor and, by means of a second end, to an input shaft 42 of the reducer 38 by means of an end pinion 44 meshing with a toothing 45 formed on the outer surface of the input shaft 42.

The reducer 38 is connected to the movable portion 18 by means of an output shaft 46 splined on its outer surface and in engagement with a crown 48 having a complementary internal toothing and solid with the movable portion 18. The output shaft 46 of the reducer interacts with the crown 48 of the movable portion in such a way that this movable portion is integral in terms of rotation with the output shaft and axially displaceable relative to the latter by the means of axial displacement which will be described later.

FIGS. 1 and 2 show that the reducer 38 comprises five epicyclic gears 50A to 50E coupled in series.

Each epicyclic gear comprises a large planet wheel 52, a central planet wheel 54A to 54E, three satellites 56A to 56E arranged at 120° relative to one another and in engagement with the large planet wheel and the central planet wheel, and a satellite carrier 58A to 58E.

The central planet wheels 54A to 54E and the satellite carriers 58A to 58E of the epicyclic gears as well as the input 42 and output 46 shafts of the reducer 38 are of generally tubular shape and are coaxial with the axis X—X of the laser head and with the optical fiber 24 passing longitudinally through the reducer.

The central planet wheel $54_A$ of the epicyclic gear 50A, the lowest as seen in FIG. 1, is solid with the input shaft 42 of the reducer 38. The satellite carrier 58E of the epicyclic gear 50E, the uppermost as seen in FIG. 1, is solid with the output shaft 46 of the reducer 38.

The large planet wheels 52 of each epicyclic gear 50A to 50E consist of an internally toothed tubular member common to all the epicyclic gears and solid with the fixed portion 20 of the laser head.

The satellite carrier 58A to 58D of a lower epicyclic gear is solid with the central planet wheel 54B to 54E of an epicyclic gear which is immediately above it.

The various rotary elements of the reducer 38 are retained axially by suitable means which have been represented schematically by flanges 57 solid with the fixed portion 20 and collars 59 provided on the input shaft 42.

The reduction ratio of the reducer is equal to $1/3^5$. When there are n epicyclic gears coupled in series, the reduction ratio is $1/3^n$.

The means of axial displacement of the movable portion 18 of the laser head comprise a thread 60 arranged on the outer peripheral surface of the movable portion and, during the rotation of the movable portion, interacting with an internally threaded ferrule 62 solid with the fixed portion 18 and coaxial with the latter.

The distal end 26 of the optical fiber 24 comprises a ring 64 carried by a rolling thrust bearing 66 solid with the movable portion. This thrust bearing 66 makes the distal end of the optical fiber integral with the translational movement of the movable portion, while at the same time allowing this movable portion to rotate about the optical fiber which is immobilized in terms of rotation.

The device for working by laser comprises means (not shown) for the elastic return of the optical fiber 24, ensuring the automatic adjustment of the length of the optical fiber as a function of the axial displacement of the movable portion carrying the distal end 26 of the optical fiber.

The thrust bearing 66 is provided with axial orifices 68 allowing the passage of a gas conventionally used for welding operations under a controlled atmosphere. This gas is delivered by known means into the tubular extension piece 14 upstream of the reducer 38, i.e., in the lower part of the laser head, as seen in FIG. 1. The gas passes through the hollow input shaft 42 of the reducer, the central planet wheels 54A to 54E, the satellite carriers 58A to 58E and the hollow output shaft 46 of the reducer. The gas subsequently passes through the orifices 68 of the thrust bearing and the aperture 34 so as to reach the welding zone. A gas circulation is likewise ensured on the outside of the welding head 10 between the latter and the tubular element 12.

The device for working by laser which has just been described allows helical welds to be made. It is also possible to make circular welds, in particular by omitting the means for the axial drive of the movable portion 18 of the laser head, which consist of the thread 60 interacting with the internally threaded ferrule 62.

The drive motor used for displacing the movable portion of the laser head can be an electric or pneumatic motor of standard type, conventionally employed for handling operations in the steam generator. The drive motor rotates at a relatively high speed, making it possible to transmit a uniform rotational movement over a long distance as far as the reducer arranged in the vicinity of the movable portion of the head. The high coefficient of speed reduction of the reducer makes it possible to adapt the speed of the motor to the relatively slow rotational movement of the movable portion. In the example described, the movable portion of the laser head rotates at a speed of 15 revolutions per minute.

The invention allows helical or circular welding beads to be made at different heights in the primary-water tubes of a steam generator from the tube plate fastening the ends of the tubes to the last spacer plate of the tube bundle.

The invention also makes it possible to carry out any type of work by laser requiring a rotary laser head.

I claim:

1. Device for working inside a tubular element by laser, said device comprising a laser head which comprises a movable portion provided with an aperture for exit of a working laser beam, and means for driving said movable portion in rotation, comprising a motor located outside of said laser head, a speed reducer and flexible means for transmitting rotational movement of said motor to said movable portion by means of said reducer, wherein said speed reducer is arranged in a rotationally fixed portion of said laser head, in the vicinity of said movable portion.

2. Device according to claim 1, wherein said reducer comprises at least one epicyclic gear comprising a large planet wheel with internal toothing, a central planet wheel, satellites in engagement with said large planet wheel and said central planet wheel, and a satellite carrier, said central planet wheel of an epicyclic gear being solid with an input shaft of said reducer, said satellite carrier of an epicyclic gear being solid with an output shaft of said reducer, and said large planet wheel of each epicyclic gear being solid with said rotationally fixed portion of said laser head.

3. Device, according to claim 2, wherein said reducer comprises at least two epicyclic gears coupled in series in such a way that the fixed large planet wheels consist of an internally toothed tubular member common to all of said epicyclic gears and the satellite carrier of an upstream epicyclic gear is solid with the central planet wheel of a succeeding epicyclic gear, the upstream epicyclic gear being that of these two gears which is nearer an input of said reducer.

4. Device according to claim 3, wherein said reducer comprises five epicyclic gears coupled in series.

5. Device according to claim 2, wherein the central planet wheels, the satellite carriers of the epicyclic gears and the input and output shafts of said reducer are of generally tubular shape and are coaxial with a longitudinal axis of said laser head and with an optical fiber passing longitudinally through said reducer and conveying a working laser beam.

6. Device according to claim 5, wherein a distal end of said optical fiber is integral in terms of translational movement with said movable portion, but free in terms of rotation relative to said movable portion.

7. Device according to claim 2, wherein said output shaft of said reducer has a splined outer surface and interacts with a crown having a complementary internal toothing solid with said movable portion of said laser head, in such a way that said movable portion is integral in terms of rotation with said output shaft and axially displaceable relative to said output shaft.

8. Device according to claim 2, herein the means for transmitting the rotational movement of said motor comprise a transmission shaft equipped with an end pinion meshing within external toothing of said input shaft of said reducer.

9. Device according to claim 2, wherein the epicyclic gears each comprise three satellites.

* * * * *